United States Patent [19]

Gregerson et al.

[11] Patent Number: 4,650,048
[45] Date of Patent: Mar. 17, 1987

[54] CONTROL SYSTEM FOR TRANSMISSION ENGAGEMENT

[75] Inventors: Stanley M. Gregerson, Cedar Falls; Robert E. Haight, Waterloo, both of Iowa; Timothy J. Mattson, Austin, Tex.

[73] Assignee: Deere & Company, Moline, Ill.

[21] Appl. No.: 779,555

[22] Filed: Sep. 24, 1985

[51] Int. Cl.⁴ .............................................. B60K 41/22
[52] U.S. Cl. ...................................... 192/3.57; 74/850
[58] Field of Search .................. 192/0.08, 0.092, 3.57, 192/3.58; 74/850

[56] References Cited

U.S. PATENT DOCUMENTS

| 3,468,194 | 9/1969 | Horsh et al. | 192/87.19 X |
| 3,574,288 | 4/1971 | Barth et al. | 74/850 |
| 3,709,065 | 1/1973 | Starling | 74/753 |
| 3,863,523 | 2/1975 | Starling et al. | 74/754 |
| 4,345,490 | 8/1982 | Madson | 74/761 |
| 4,396,099 | 8/1983 | Shirley | 192/3.57 |

*Primary Examiner*—Rodney H. Bonck
*Assistant Examiner*—Richard M. Lorence

[57] ABSTRACT

A control system for preventing engagement of a transmisson when its power source is started with the transmission in gear. The system uses a control valve, an engagement override valve, a check valve and a relief valve to interrupt fluid flow to clutch or brake elements during initial startup unless the transmission is in neutral or park. Unwanted triggering of the override system upon a reduction of hydraulic pressure is avoided in this control system. The control valve of this system may be made responsive to clutch pedal or shift lever movement.

21 Claims, 5 Drawing Figures

CONTROL SYSTEM FOR TRANSMISSION ENGAGEMENT

BACKGROUND OF THE INVENTION

Field of the Invention

This invention relates to a control system for drive transmissions and, more particularly, to a fluid pressure operated control system for preventing engagement of the transmission in an improper starting position.

Motorized vehicles and machinery including those used in agricultural and industrial type equipment often have one or more clutches and brakes which are actuated by fluid pressure in order to transfer torque between the power source and the driven device. A control system is usually provided with an electric neutral start switch for preventing starting of the vehicle or machinery until a neutral or, in the case of vehicles, a park position is selected for the drive train. However, operators may electrically bypass such a device when it is inconvenient to use the starter switch thereby allowing the vehicle or machinery to be started in a drive position. This can occur if an operator jump-starts a vehicle that has been left in gear and, upon starting, the vehicle moves in a forward or reverse drive. Numerous types of control systems incorporating an engagement override valve (EOV) for interrupting fluid flow to fluid actuated clutches when a vehicle has been started with a transmission in a drive condition are disclosed in the art.

EOV's for preventing drive from an engaged transmission when an engine is started have been incorporated into transmissions in various ways. U.S. Pat. No. 3,863,523 issued Feb. 19, 1975 to J. Starling et al teaches a complete transmission control system for controlling speed ratio devices and directional devices. The control system incorporates an EOV to ensure that no fluid can be supplied from a fluid source to actuate a speed ratio device unless the directional controls are in a neutral position. When the vehicle is started in a neutral condition, fluid pressure builds up and causes the EOV to shift to a position allowing full flow of fluid to the speed ratio device. The Starling system is complicated due to the presence of many valves and modulating devices for controlling the total operation of the transmission. Another complicated system is disclosed in U.S. Pat. No. 3,468,194 to Horsch. Horsch uses a speed selector valve, a directional selector valve, a pressure modulating valve and a differential valve to control the total function of a transmission. The differential valve in Horsch also includes an engagement override portion which, upon attempting a startup in a drive condition, acts to block flow to the directional selector valve and ultimately the directional clutches. A more simple control device which incorporates an EOV, and is particularly suited for preventing engagement of a clutch actuated transmission is U.S. Pat. No. 4,396,099 issued Aug. 2, 1983 to Shirley. This patent teaches an EOV which is shifted from an initial override position to an engagement position by temporarily redirecting fluid flow from a control valve directly linked to a clutch pedal. The Shirley patent is much simpler than the other references since the operation of the EOV and the clutch control valve are not tied to other transmission functions.

Although the above-described control systems will provide the necessary safety function under most conditions, these systems have often been avoided due to the complexity and cost involved. While the Shirley system is much simpler and therefore does not involve the cost disincentives, it along with the other systems have the drawback that the EOV may shift to the override position during normal operation when high fluid demands cause low pressure within the fluid supply system.

Typically, an EOV is constructed such that it is moved to the operational position by build up of pressure on one side of a spool valve which is spring loaded on the opposite side to move the valve spool to an override position when fluid pressure is released. In many systems, the chamber for holding engagement pressure is in direct communication with the pressure source for the hydraulic circuit. Consequently, during periods of low pressure, the EOV can act as an accumulator which moves into the override position as fluid is supplied to lower pressure zones. This loss of pressure is particularly likely to occur in systems that use multiple clutch or brake elements.

This untimely disengaging action of the EOV, which will require additional clutching or movement of the shift lever back to neutral to regain drive train engagement, is annoying and disruptive to vehicle operations. Unexpected disengagement of the transmission causes the operator to lose vehicle power and control of forward or backward movement. Therefore, it is desirable to have a system that will maintain the EOV in an operational position during a temporary loss of sustaining pressure.

U.S. Pat. No. 3,709,065 issued Jan. 9, 1973 to Starling shows another transmission control system having an EOV which incorporates an orifice into the side of the EOV for retarding the disengagement function when the control system loses pressure. The orifice acts to prolong the period for disengagement of the EOV during periods of low system pressure by restricting fluid flow. However, the metering action of the orifice is not completely satisfactory. On one hand, a relatively large orifice may not provide sufficient time before the valve closes in which pressure may be reestablished in the system. Conversely, if the orifice is made very small it may take an inordinate amount of time for the EOV to reset to the override position.

An EOV that avoids the problem of untimely disengagement would be particularly useful in multispeed continuous drive transmissions. When operating such transmissions, certain speed selections may require the simultaneous filling of three or more clutch or brake elements. These large fluid demands can cause the low pressure condition which would move the EOV to an override position requiring shifting of the transmission back to a neutral position in order to reestablish drive. In addition, multispeed continuous drive transmissions do not require the use of the clutch pedal in order to engage the transmission. Therefore, a clutch activated EOV is unsuitable for these transmissions.

SUMMARY OF THE INVENTION

Accordingly, the general object of this invention is to provide a control system for an engagement override function which will be unknown to the operator unless start-up is attempted with the transmission in a drive condition.

A more specific object is to provide a control system for a transmission having an EOV which once shifted to an operational position, after the power source is started, will stay in such position during periods of prolonged low pressure.

A further object of the invention is to provide a control system having an EOV which is particularly suited for the high fluid demands of a multispeed continuous drive transmission.

In summary, this invention relates to a control system for a transmission having one or more fluid actuated friction devices for conditioning the drive from a mechanical power source. The control system includes a source of fluid pressure, a fluid reservoir, means for activating the friction devices by fluid pressure, a control valve, an EOV, and means for maintaining pressure in the EOV until a predetermined reset signal is generated. The control valve is used to provide fluid pressure for shifting the EOV to an operational position when the transmission is in a neutral or a non-drive condition and is movable between an open position connecting the source to an EOV passage and a closed position connecting the EOV passage to the reservoir. The EOV is biased to an override position by biasing means and receives fluid from the control valve via the EOV passage to maintain the EOV in an override position when the power source is started with the transmission in a drive condition and the control valve is in an open position. In the override position, fluid for activating the friction device is sent to the reservoir. When the control valve is moved to a closed position, fluid from the pressure source acts against the biasing means to move the valve to an engagement position which allows fluid to travel to the friction device activating means. Means is provided for preventing loss of fluid pressure acting to hold the valve in an engagement position when pressure from said source decreases. Pressurized fluid acting to maintain the EOV in an engagement position is released when a predetermined signal indicates output from the power source below a predetermined level.

In a more specific embodiment, fluid acting to keep the EOV in an engagement position is maintained by a check valve which only allows fluid to enter from the fluid source and a relief valve which maintains fluid pressure for engagement until a reset signal is generated.

In a preferred embodiment, the relief valve is opened by the sensing of fluid pressure, developed by the power source, below a predetermined level.

Other objects and embodiments of the present invention will become apparent to those skilled in the art in view of the following description and drawings.

DETAILED DESCRIPTION

Figure 5:
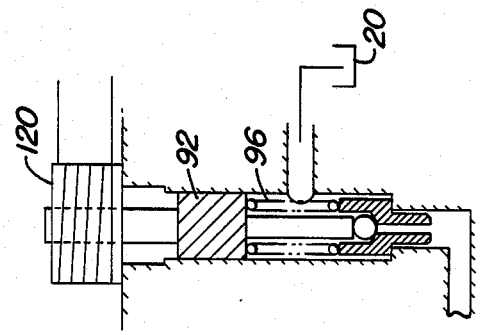
FIG. 5 is a partial section of a portion of the control system showing a modified form of relief valve.

The control system of this invention uses a control valve, an EOV, and a means for controlling the release of pressurized fluid from the EOV. These elements are arranged to control the engagement of a transmission as later described in the following preferred embodiment.

The function of the control valve in this invention is to provide fluid flow for maintaining the EOV in an override position when the machinery or vehicle is started with the transmission in a drive condition. Accordingly in its simplest form, the valve has an open position connecting the pressure source to an EOV passage and a closed position connecting the EOV passage to the reservoir. In addition to these functions, the control valve can be used to control fluid flow to directional clutches. In a preferred embodiment, the control valve also provides mechanical contact with a neutral start switch so that the hydraulic and electrical override functions are determined by the movement of a single element.

The EOV of this invention is used to interrupt a flow of pressurized fluid for directly or indirectly activating hydraulically actuated friction elements for transferring torque in a drive train. The EOV of this invention has means responsive to fluid pressure directly from the source which urge the valve to an engagement position. Means responsive to fluid pressure from the EOV passage are also provided which act to hold the EOV in an override position when the control valve is an open position. It is possible to have the entire flow of actuating fluid blocked by the EOV. In a preferred embodiment, the EOV regulates a pilot flow of fluid which is used to activate pilot operated shift valves which control the actuation of the friction elements. Whether the EOV is used to regulate a pilot flow or a full flow, it is within the scope of this invention that the fluid be used to engage speed control or directional control friction elements.

An important aspect of this invention is the means for maintaining the fluid pressure for preventing loss of fluid pressure acting to urge the EOV to an engagement position when fluid pressure from the source decreases and releasing the pressure responsive to a signal. One such means for controllably maintaining engagement pressure uses a check valve and relief valve. The check valve is arranged to only admit pressurizing fluid while the relief valve remains closed until triggered by a signal at which time pressure is released and the EOV is reset to an override position. Typically, the signal will be an operating parameter associated with the power source delivering mechanical input to the transmission which indicates a shutdown condition. A suitable signal is engine idle speed which could be tied to a solenoid controlled relief valve. The solenoid valve would release pressure within the control system when the engine drops to a sufficiently low speed. When the signal is hydraulic pressure, the relief valve can respond to a signal from any hydraulic system powered by the engine. Thus, the sensed hydraulic pressure can be that within the source of pressurized fluid supplying hydraulic fluid to the control system. In a preferred embodiment, the relief valve is activated by low pressure in a separate hydraulic system such as a main hydraulic pump circuit. Those skilled in the art are aware of various constructions for the pressure responsive relief valve. For example, it is possible to use a combination relief valve and check valve thereby eliminating the need for a separate check valve and relief valve. However, whether alone or in combination, any check valve and relief valve arrangement may be used as the means to retain pressure in the EOV provided the release of pressure is controlled by a positive signal which shifts the EOV to an override position at an appropriate time.

A more complete understanding of the function and relationship of these elements may be obtained from the following description of the preferred embodiment.

DESCRIPTION OF THE PREFERRED EMBODIMENT

Figure 1:
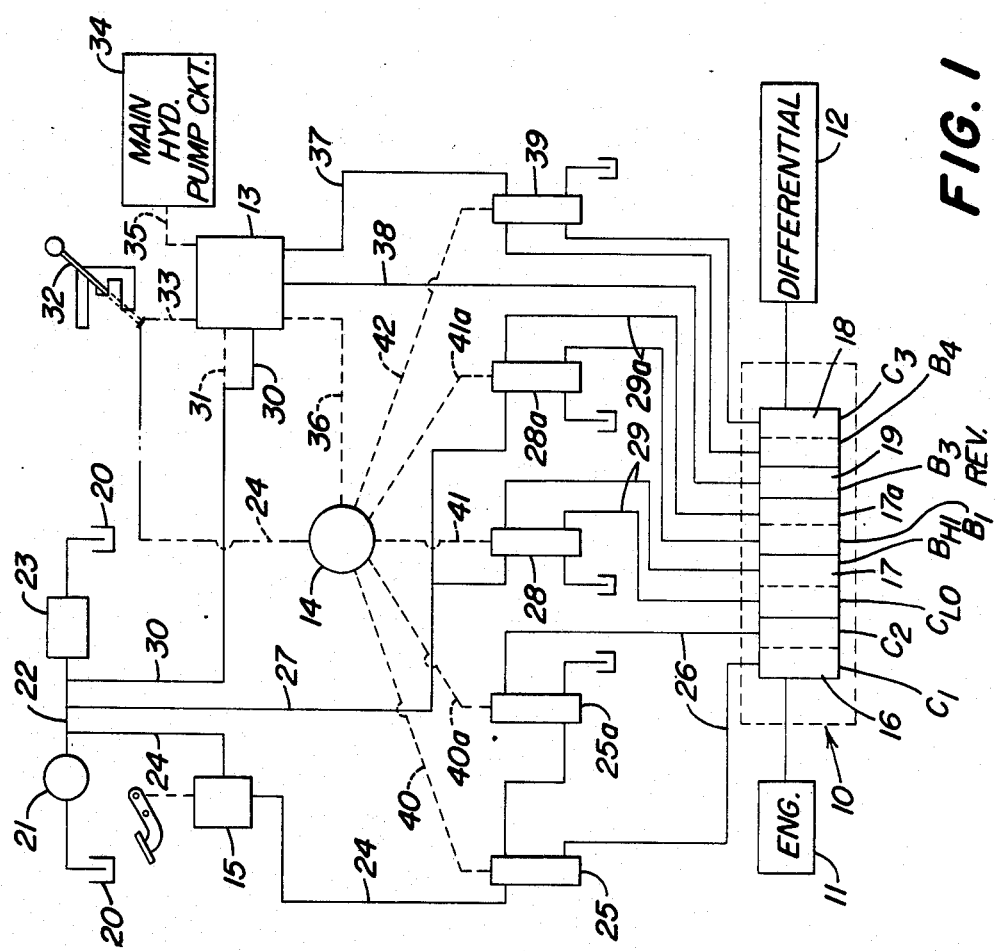
FIG. 1 is a block diagram of a transmission control circuit showing the control system of the present invention.

FIG. 1 illustrates in block diagram form, the connection between a vehicle power train and various control elements. The power train consists of an engine 11 connected to a differential 12 through a transmission 10. Control elements 13, 14 and 15 determine the engagement of friction devices within transmission 10. These friction devices consist of main engine clutches 16, speed ratio brakes and clutches 17 and 17a, a reverse brake 19, and forward brake and clutch 18. The interrelationship and operation of these friction elements are fully explained in U.S. Pat. No. 4,345,490 issued to Madson. The friction elements 16–19 are also labeled with a C or B in FIG. 1 to show their correspondence with the friction elements in U.S. Pat. No. 4,345,490.

Looking in more detail at FIG. 1, fluid is taken from a reservoir generally referred to as 20 into transmission pump 21 powered by engine 11. Pump 21 delivers fluid under pressure through a line 22. Pressure within line 22 is limited by a pressure relief valve 23. A stream of fluid is taken through a line 24 and delivered to pilot operated control valves 25 and 25a across a foot operated clutch valve 15. Upon receiving a hereinafter described fluid signal from rotary valve 14, one of pilot valves 25 or 25a opens to supply actuating fluid to its respective main engine clutch 16 through a line 26. Another pressurized stream of fluid is taken from line 22 through a line 27 to pilot operated control valves 28 and 28a. Valves 28 and 28a are connected to respective pairs of outlet lines 29 and 29a. A line from each line pair 29 and 29a provides pressurized fluid at all times to friction devices 17 and 17a, respectively. Valves 28 and 28a shift fluid communication between a given line in line pairs 29 and 29a in response to a fluid signal from rotary valve 14. Finally, line 30 conveys a third stream of fluid to control system 13. A branch line 31 from line 30 conveys an additional stream of fluid to the control system 13.

In addition to fluid input from pump 21, control system 13 receives mechanical signal input from a shift lever 32 through control valve linkage 33 and fluid input from a main hydraulic pump circuit 34 through line 35. The pump for circuit 34 is also driven by engine 11. These signals are used, in a manner hereinafter described, to determine flow through lines 36, 37 and 38 which exits the control system. Lines 37 and 38 supply the full flow of actuating fluid for the forward brake and clutch 18, and reverse brake 19, respectively. Fluid from line 38 directly actuates reverse brake 19 while fluid from line 37 enters pilot operated control valve 39 which operates in a manner similar to valve 28 to effect a further speed change controlled by rotary valve 14. A pilot flow of fluid is supplied to rotary valve 14 by line 36. Fluid entering rotary valve 14 from line 36 is directed into one or more of lines 40, 40a, 41, 41a and 42 which are each connected respectively to pilot operated control valves 25, 25a, 28, 28a and 39 for the previously described friction devices. Positioning of the rotary valve establishing flow through lines 40-42 is determined using input from shift lever 32 transmitted by linkage 24. When line 40 or 40a is not conveying fluid pressure to pilot valves 25, 25a main engine clutches 16 are not actuated and no engagement of the transmission is possible.

Figure 2:
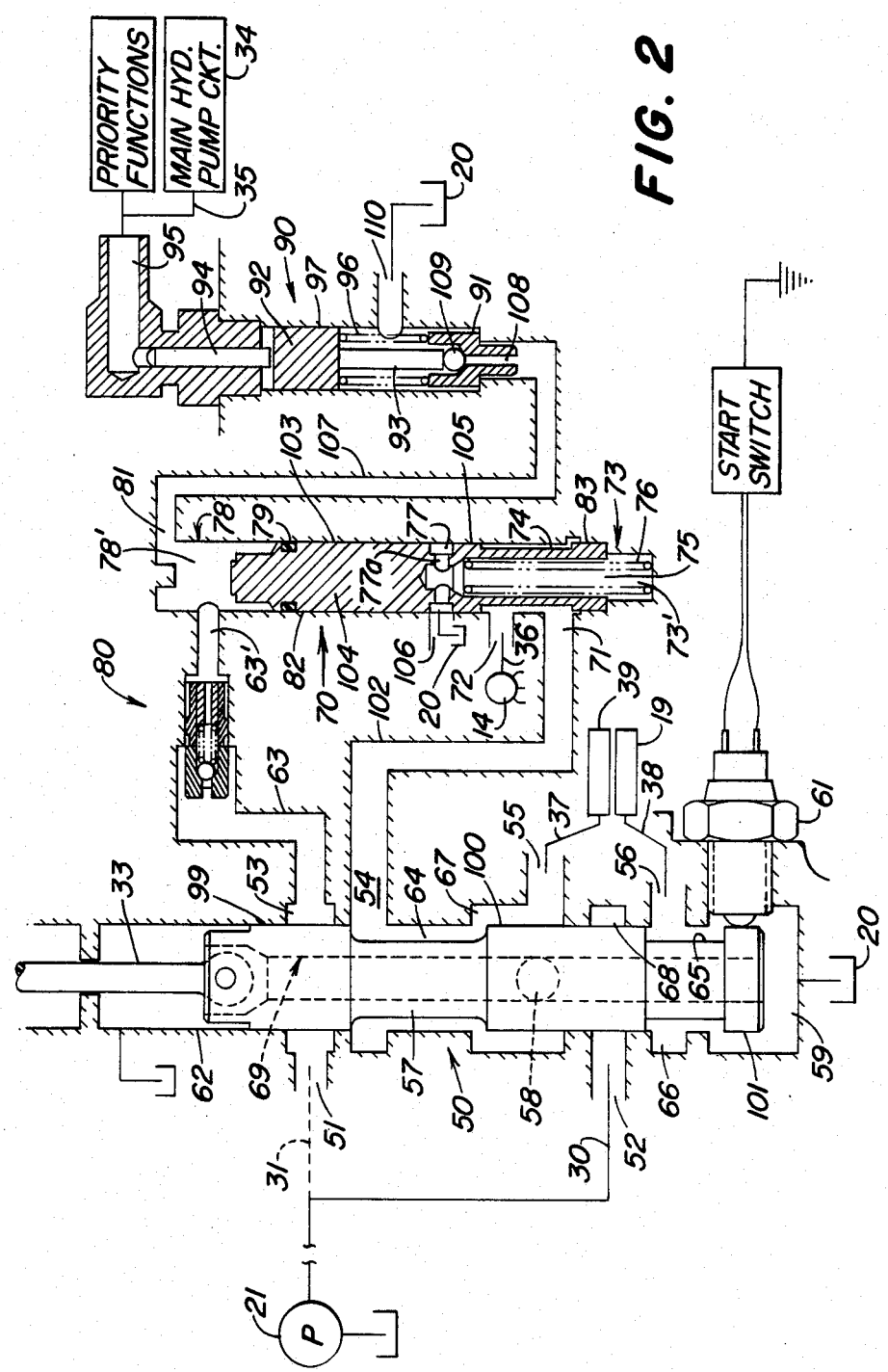
FIG. 2 is a sectional view of the control system of the present invention.

Turning now to FIG. 2, control system 13 is shown as consisting of a control valve 50, an EOV 70, a check valve 80 and a relief valve 90. In addition to the valve components, FIG. 2 also shows linkage 33 which is connected to shift lever 32 (not shown in FIG. 2), and provides movement to the control valve spool 57, and a neutral start switch 61 for electrically preventing engagement of the starter when the transmission is in a drive condition.

The operation of control valve 50 is governed by positioning valve spool 57 through linkage 33. Valve spool 57 contains internal bore 69 and is located within a bore 62. Valve spool 57 has an upper land portion 99 followed by an upper annular groove 64, a middle land 100, a bottom groove 65 and a bottom land 101. Connected to the bore are inlet ports 51 and 52 which receive pressurized fluid from lines 31 and 30, respectively. Inlet 51 is connected to annular groove 53 which provides a constant supply of pressurized fluid to a passage 63. Valve spool 57 is shown in its lowest position, corresponding to a neutral condition, with land 99 blocking fluid flow from annular groove 53 to a port 54. As valve spool 57 is moved upward to a drive position (see FIG. 3), fluid is communicated from groove 53 to port 54 across annular groove 64. Inlet port 52 is blocked by land 100 when spool 57 is in a neutral position and is connected with a forward port 55 or a reverse port 56 as spool 57 is moved upward into one of two upper drive positions. Outlets 55 and 56 are connected respectively to lines 37 and 38 which supply pressurizing fluid to pilot operated valve 39 and reverse brake 19. When control valve 50 is in a neutral position as shown in FIG. 2, outlet 55 is connected to reservoir 20 through a spool port 58, internal bore 69 and chamber 59, and outlet 56 is connected with reservoir 20 through chamber 59 across annular groove 65. Bottom land 101 serves to contact the neutral start switch 61 when spool 57 is in a neutral position to thereby enable completion of a starter motor circuit. When spool 57 is in a drive position land 101 blocks fluid flow from inlet 52 to chamber 59.

Control valve 50 is in communication with EOV 70 via passages 63 and 102. EOV 70 has a bore 103 which is divided into an upper end 78 and lower end 73 by override spool 104. Chambers 78' and 73' are shown in the upper and lower portions, respectively, of bore 103 which are not occupied by spool 104. Pressure acting within these chambers provides a means for exerting forces to move or hold spool 104 in an engagement or override position. The volume of chambers 78' and 73' will vary as the spool changes position. Passage 63 is connected to groove 53 and to the upper portion 78 of bore 103 via inlet 63' and thus makes a constant supply of pressurized fluid available to upper portion 78. Passage 102 connects lower end 73 with port 54 through an inlet 71. Depending on the position of spool 57, inlet 71 is either connected to inlet 51 or reservoir 20 of control valve 50. Override spool 104 has an upper land portion 82 for blocking fluid flow between upper end 78 and lower end 73 with additional sealing provided by an O-ring and O-ring groove 79. Below land 82 and proceeding down the spool is an annular groove 77 which communicates with an internal bore 75 through a port 77a, a middle land 105, a lower annular groove 74 and a bottom land 83. When spool 104 is shifted upward, the EOV is in an override position (see FIG. 4) and lower annular groove 74 connects a rotary valve port 72 with a reservoir outlet 106 while land 83 blocks fluid communication between ports 71 and 72. When the spool 104 is shifted downward, as shown in FIG. 2, the EOV is in an engagement position wherein port 71 is in communication with rotary valve port 72 and annular groove 77 is aligned with reservoir port 106. Internal bore 75 contains a spring 76 which biases valve spool 104 to an upper or override position when fluid in upper end 78 is released through a relief port 81.

A check valve 80 is positioned across passage 63 to allow entry of fluid from the source while preventing backflow of fluid from upper end 78. The construction of such check valves is well known to those skilled in the art.

The release of fluid from chamber 78' is controlled by the relief valve 90. Passage 107 connects a relief valve inlet 108 to outlet 81. Fluid flow out of the relief valve is prevented by a ball 109 and seat 91 which are held in contact by a plunger 92 through a rod 93. Plunger 92 is located in relief valve bore 97 which has an outlet 110 connected to the reservoir 20. Outlet 110 is positioned between ball 109 and plunger 92. Contact pressure for plunger 92 is provided by a pin 94. Pin 94 is urged downward by pressure in a passage 95 connected to the main hydraulic pump circuit 34. Contact pressure from plunger 92 is reduced by force from a spring 96 which serves to open relief valve 90 at lower pressure levels in the main hydraulic circuit.

OPERATION

Figure 3:
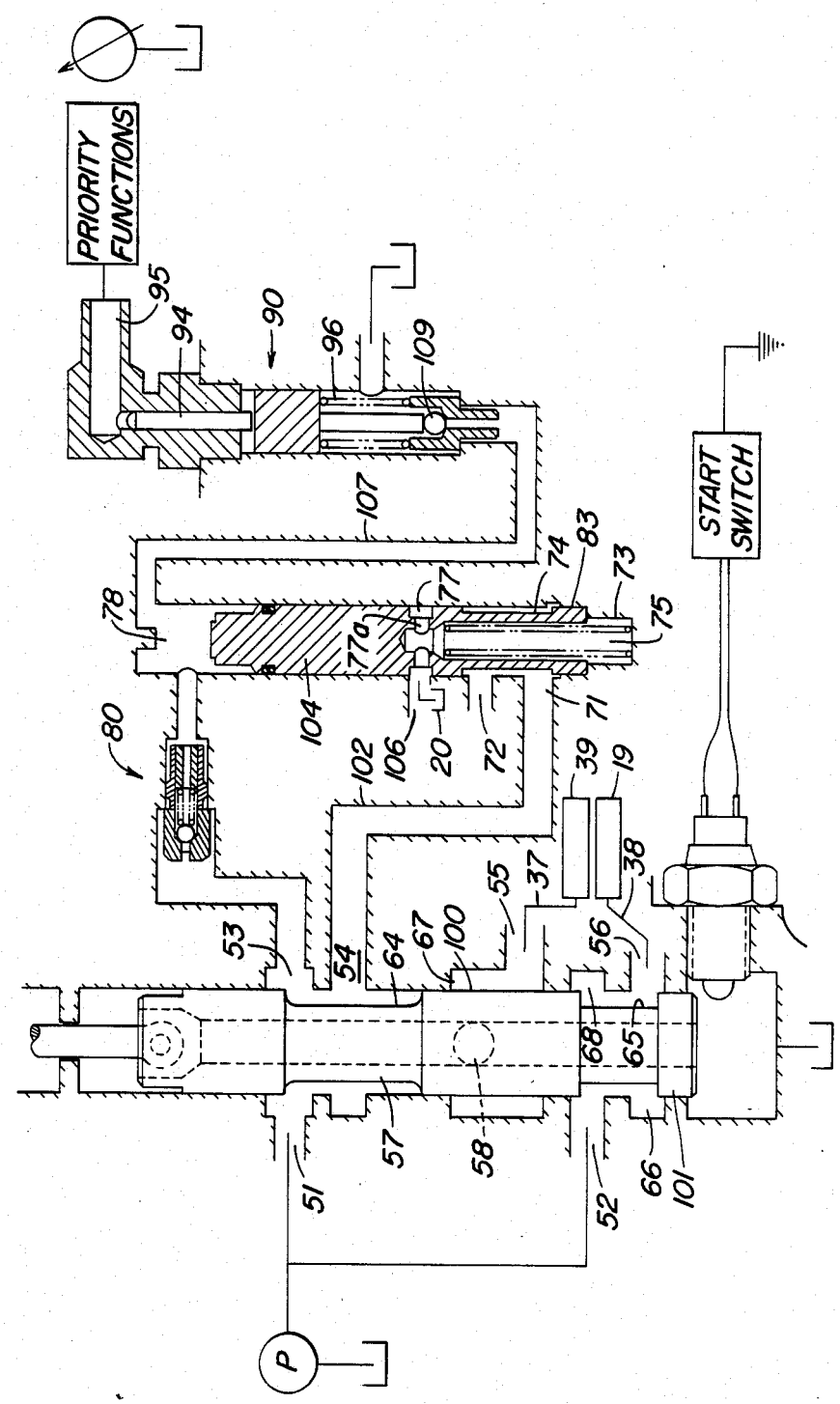
FIG. 3 is similar to FIG. 2 with valves shown in a different position.
Figure 4:
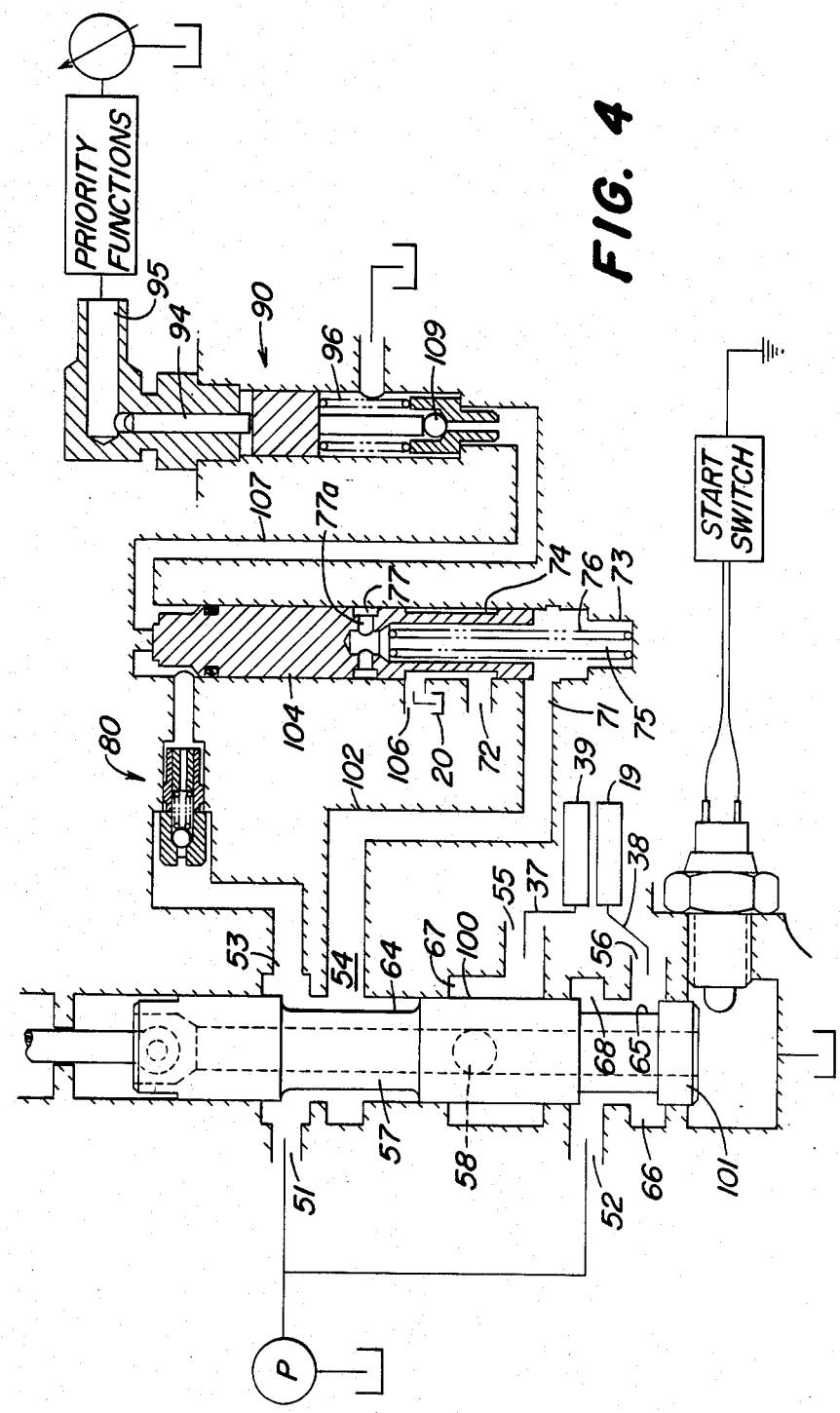
FIG. 4 again is similar to FIGS. 2 and 3 with valves shown in a different position.

The operation of the control system can be more fully understood with reference to FIGS. 2-4 showing the control valve and disengagement valve in the various operating positions during the startup and engagement of the vehicle drive train.

Looking first at FIG. 2, the control valve and EOV are shown in a final position corresponding to a startup with the transmission in a neutral condition. At the start of this procedure, the EOV has been previously reset to the upper or override position (see FIG. 4) and the operator has moved the shift lever to its neutral position so that valve spool 57 is in its lowermost or neutral position. In this position, fluid flow from inlet 51 to port 54 is blocked by land 99 while groove 64 allows communication between port 54 and reservoir 20 through spool port 58 and internal bore 69. At the same time, fluid flow from inlet 52 is blocked by land 100 while outlets 55 and 56 are connected to reservoir 20 by port 58 and annular groove 65, respectively. With inlet 52 blocked and outlets 55 and 56 in communication with reservoir 20, directional clutches 18 and 19 (FIG. 1) cannot be activated and power cannot be transmitted to the differential 12. Simultaneously, the blocking of fluid flow from inlet 51 to port 54 allows the EOV spool 104 to be shifted downward into an engagement position once the engine is started and pump 21 begins to deliver pressurized fluid.

Looking then at the EOV, the downward shifting of spool 104 is effected by the accumulation of fluid in chamber 78' which enters through passage 63 across check valve 80. Force acting on the upper end of valve spool 104 overcomes the force of spring 76 and shifts spool 104 downward. Any fluid in the lower portion 83 of valve bore 82 is relieved by the connection of port 71 to reservoir 20 through passage 102 and control valve port 54 or communication between annular groove 77 and reservoir outlet 106. Fluid pressure acting to hold the engagement override spool in a lower position (as shown in FIG. 2) will be maintained by check valve 80 until relief valve 90 is activated.

Relief valve 90 remains in a closed position as long as the pressure in passage 95 supplies sufficient force to pin 94 to overcome the force of spring 96 and pressure acting on ball 109. Relief valve 90 is activated when main hydraulic pressure in circuit 34 approaches a very low level indicating that the vehicle engine has been stopped.

Referring now to FIG. 3, after the vehicle has been started in a neutral position, the operator may move the shift lever to a drive position, in this case reverse, thereby shifting the control valve spool 57 to the position shown. In further reference to FIG. 3, the control valve spool 57, in the reverse drive position, supplies pressurized fluid from inlet 52 to port 56 and line 38 which ultimately acts to engage reverse brake 19. With the upward location of the control valve spool 57, fluid flow to passage 102 across land 64 is established. However, the previous start procedure allowed fluid pressure to build up in the chamber 78' of the EOV. The fluid in chamber 78' acts against the force from spring 76 to keep spool 104 in the lower engagement position until fluid is released from chamber 78'. Fluid entering the EOV through port 71 is directed to rotary valve 14 by connection of ports 71 and 72 across groove 74 which supplies fluid for activating the pilot operated control valves 25, 28, 28a and 39 through control valve 14 so that main clutches 16 may be engaged and drive established to the differential. Any leakage of fluid across bottom land 83 to lower valve end 73 is drained to sump by internal bore 75 through port 77a, annular groove 77 and port 106 thereby assuring that the EOV will remain in an engagement position until relief valve 90 is opened. Once the engine has been shut off, relief 90 opens relieving pressure in passage 107 and end 78 of the EOV. Release of pressure in upper end 78 allows spring 76 to move spool 104 up to its initial or nonpressurized position as shown in FIG. 4.

Considering next startup of a vehicle in a drive condition, FIG. 4 depicts the position of the EOV in an override position. The EOV assumes this position when the engine is turned off and maintains this position following startup of the engine in a drive condition until the shift lever is put in a neutral position.

Looking now in detail at this sequence, EOV spool 104 has been previously reset upward by spring 76 and the release of pressure from relief valve 90. The control valve spool 57 is in a reverse drive position so that, in the manner previously described, reverse brake 19 is actuated and pressurized fluid is delivered to lower end 73 and upper end 78 of the EOV. With the EOV in this upward position, groove 74 connects rotary valve port 72 with reservoir 20 through reservoir port 106. When in this position, no fluid can be delivered to the rotary valve which in turn prevents actuation of main clutches 16 and prevents any drive from the engine. While fluid is still constantly supplied to upper end 78 of the EOV, fluid at the same pressure is also supplied to lower end 73 by the control valve. Since pressure is balanced on each side of the valve spool, spring 76 maintains the spool in an upper override position.

Drive may be established following startup in a drive condition by moving the shift lever back to a neutral position. This moves control valve spool 57 into its lower position as shown in FIG. 2, thereby connecting lower end 73 of EOV 70 to reservoir 20 so that pressure in the upper end 78 can shift valve spool 104 downward into an engagement position.

Although the override operation of the EOV has been described when control valve spool 57 is in a reverse drive position, the override function is essentially the same when startup is attempted in a forward drive condition. In a forward drive condition, control valve spool 57 is shifted to a position above that shown in FIGS. 3 or 4 so that land 101 blocks fluid flow from groove 68 to groove 66 and outlet 56 while inlet 52 communicates with chamber 67 across groove 65. Spool port 58 is now above chamber 67 thereby allowing communication of fluid pressure to pilot valve 39 through through line 37 and outlet 55. At the upper end of control valve 50, valve spool 57, when in a forward position, connects inlet port 51 to port 54 across groove 64. Thus fluid pressure is still transmitted to lower end 73 of the EOV through passage 102 so that the operation of the EOV is unchanged.

ALTERNATE EMBODIMENT

FIG. 5 shows an alternate embodiment of the relief portion of control system 13. In this embodiment, the control system functions in substantially the same manner described previously except that the opening and closing of relief valve 90 is controlled by a solenoid 120 instead of the pressure from a hydraulic circuit. Solenoid 120 is energized to maintain sealing pressure on plunger 92 and deenergized to allow the spring 96 to open the relief valve. An energizing current is conducted to the solenoid in response to the engine tachometer (not shown) registering a minimum number of revolutions per minute. Energizing the solenoid above a speed of 400 rpm provides a good cut off point since this is well above the usual engine cranking speed of 100 to 200 rpm yet below a normal idle speed. Thus, once the engine is started and its speed exceeds 400 rpm, the solenoid is energized closing the relief valve and allowing pressure to build in the upper end of the EOV.

The foregoing description of the preferred embodiment and alternate embodiment is not meant to limit the broad scope of this invention. Those skilled in the art can appreciate the many alternatives, variations and modifications to which this invention is susceptible. Accordingly, this invention embraces all such adaptations within the scope of the appended claims.

We claim:

1. A control system for a transmission having one or more fluid pressure actuated friction devices for conditioning the drive from a mechanical power source to a driven member, said system comprising:
   (a) a source of fluid pressure;
   (b) a fluid reservoir;
   (c) means for activating at least one of said friction devices in response to fluid pressure from said source;
   (d) a manually movable control valve movable between an open position in which it connects said source to an EOV passage and a closed position in which it connects said EOV passage to said reservoir;
   (e) an EOV for controlling fluid flow between said source and said activating means including means responsive to fluid pressure directly from said source to urge said EOV to an engagement position in which it permits fluid flow from said source to said activating means, means continuously biasing said EOV toward an override position in which it blocks communication between said source and said activating means while establishing fluid communication between said activating means and said reservoir, and means responsive to fluid pressure in said EOV passage when said control valve is in an open position and said EOV is in an override position to hold said EOV in the override position until said control valve is moved to the closed position; and
   (f) means for preventing loss of fluid pressure acting on the means to urge the EOV toward the engagement position when fluid pressure from said source decreases and means for relieving said pressure in response to a signal indicative of a power output from said mechanical power source below a predetermined level.

2. The control system of claim 1 wherein said signal is generated in response to power source speed below a predetermined level.

3. The control system of claim 1 wherein said signal is generated when fluid pressure in a hydraulic system pressurized by said mechanical power source drops below a predetermined level.

4. The control system of claim 3 wherein said hydraulic system has a source of pressurized fluid independent of said pressurized fluid source for said control system.

5. A control system for preventing engagement of a transmission having one or more fluid activated friction devices when an engine powering said transmission is started with said transmission in a drive condition, said system comprising:
   (a) a source of pressurized fluid;
   (b) a fluid reservoir;
   (c) means for activating said friction devices in response to fluid pressure;
   (d) a control valve comprising a bore and valve spool located therein, said bore having a pressurized fluid inlet, a reservoir outlet and an engagement override port in communication with an EOV passage, said spool being movable into a forward or reverse position wherein said control valve is in an open condition with said spool connecting said fluid inlet and said engagement override port while blocking flow from said engagement override port to said reservoir outlet, and a neutral position wherein said control valve is in a closed condition with said spool blocking fluid flow from said fluid inlet to said engagement override port while connecting said engagement override port to said reservoir outlet;
   (e) a manual actuator for moving said control valve spool into said forward, reverse or neutral position;
   (f) an EOV for controlling fluid flow between said source and said activating means including a bore having first and second variable volume chambers, a shutoff spool located between said chambers for reciprocal movement, means for providing continuous fluid communication between said first chamber and said source so that fluid pressure in said first chamber urges said spool toward said second chamber to an engagement position which permits fluid flow across said EOV from said EOV passageway to said activating means, means for biasing said spool toward said first chamber, means for connecting said EOV passageway to said second chamber when said spool is moved toward said first chamber into an override position and means for connecting said activating means with said reservoir when said spool is in said override position;

(g) means for preventing loss of fluid pressure from said first chamber when fluid pressure from said source decreases; and (h) means for releasing fluid pressure from said first chamber in response to a signal indicative of a power output from said mechanical power source below a predetermined level.

6. The control system of claim 5 wherein said means for preventing loss of fluid pressure is a one-way check valve.

7. The control system of claim 6 wherein said fluid releasing means is a relief valve which establishes fluid flow from said first chamber of said EOV to said reservoir in response to said signal.

8. The control system of claim 7 wherein said relief valve, is activated by an electronic solenoid and said signal is indicative of engine speed below a predetermined level.

9. The control system of claim 7 wherein said relief valve is activated by a predetermined positive pressure differential between fluid pressure within said first chamber and a source of fluid pressurized by said engine.

10. The control system of claim 9 wherein said engine pressurized fluid source is separate from the source of pressurized fluid for said control system.

11. The control system of claim 5 wherein said control system activates said friction devices by supplying a pilot flow of fluid to pilot operated control valves for hydraulically actuating said friction devices.

12. The control system of claim 5 wherein said control valve spool contacts an electrical neutral start switch when in the neutral position to enable an engine starter circuit to be completed.

13. A control system for engaging an engine driven transmission having fluid actuated friction devices, said system comprising:

(a) a source of pressurized fluid;

(b) a fluid reservoir;

(c) a rotary valve for selectively actuating said friction devices in response to fluid pressure;

(d) a check valve passageway in constant communication with said source of fluid having a one-way check valve located therein allowing fluid flow away from said source;

(e) a control valve comprising a main bore having a first fluid supply port fluidly connected to said pressurized fluid source, a second fluid supply port fluidly connected to said source of pressurized fluid, an EOV port connected to an EOV passage, a forward function port for supplying pressurized fluid to actuate a friction device for a forward drive condition, a reverse function port supplying fluid to actuate a friction device for a reverse drive condition, a reservoir port connected to said fluid reservoir, a valve spool located within said bore for regulating fluid flow between said ports, said spool having first, second and third lands separated by first and second grooves, a concentric throughbore in constant communication with said reservoir port and a transverse port formed in said second land which fluidly communicates with said throughbore, said spool being movable between forward, reverse and neutral positions where, in said forward or reverse positions, said second annular groove connects said second supply port with said forward and reverse ports respectively while said first supply port is in communication with said EOV port through said first annular groove and in said neutral position said first land blocks fluid flow from said first supply port to said EOV port and said second land blocks fluid flow from said second fluid supply port to said forward and reverse ports while said transverse port connects said forward function port with said reservoir port and said second annular groove connects said reverse function port with said reservoir port;

(f) a relief valve establishing communication between a relief passageway and said reservoir when said engine reaches a predetermined low level of output; and (g) an EOV valve for controlling fluid flow between said source and said rotary valve including an EOV bore having first and second ends with a variable volume chamber at each end, a shut off spool reciprocally located between said chambers having a concentric internal bore in one end opening into said second end of said EOV bore and first and second annular grooves between first, second and third lands, said second annular grooves being in communication with said internal bore, means in said second end of said EOV bore for biasing said spool to an override position, a control valve port in communication with said EOV passage and said EOV bore, a rotary valve port in communication with said rotary valve and said EOV bore, a reservoir port in fluid communication with said reservoir and said EOV bore, a relief port in communication with a relief passage and said chamber of said first end and a check valve port in communication with said EOV passage and said chamber of said first end, said EOV having an override condition in which said spool is displaced toward said first end and said second groove connects said rotary valve port with said reservoir port and an engagement position in which said spool is displaced toward said second end, said first groove and internal bore connects said chamber of said second end with said reservoir port, and said second groove connects said rotary valve port with said control valve port wherein with said EOV spool in an override position and said control valve in an open position, fluid pressure from said control valve port acts in said chamber of said second end to balance fluid pressure from said check valve port acting in said chamber of said first end thereby maintaining said spool in an override position until said control valve is moved to a closed position and said fluid pressure in said chamber of said first end overrides said biasing means and moves said valve spool to an engagement position, said valve spool being maintained in said engagement position by fluid pressure in said chamber of said first end until said engine reaches said predetermined low level of output.

14. The control system of claim 13 wherein said EOV spool has an O-ring in contact with said bore between said first groove and said first end.

15. The control system of claim 14 wherein the relief valve releases fluid pressure in response to fluid pressure in a hydraulic circuit pressurized by said engine.

16. The control system of claim 15 wherein said hydraulic circuit is independent of said control system.

17. The control system of claim 16 wherein said relief valve comprises a ball valve urged into sealing contact with a valve seat by fluid pressure from said hydraulic circuit.

18. The relief valve of claim 17 wherein said relief valve comprises a bore having a fluid inlet in communication with said second end of said EOV, a reservoir outlet, a valve ball and valve seat disposed between said inlet and outlet, and a plunger movably disposed in said bore, said plunger transmitting sealing pressure from said independent circuit to an outlet side of said valve ball while pressure from said system on the inlet side of said valve ball acts to open said valve.

19. The valve of claim 18 wherein sealing pressure from said plunger is reduced by a spring which biases said plunger away from said ball.

20. The control system of claim 14 wherein the relief valve is solenoid apparatus to release fluid pressure in response to low engine rpm.

21. The control system of claim 20 wherein the relief valve is opened by deenergization of the solenoid.

* * * * *

UNITED STATES PATENT AND TRADEMARK OFFICE
CERTIFICATE OF CORRECTION

PATENT NO. : 4,650,048

DATED : 17 March 1987

INVENTOR(S) : Stanley Martin Gregerson et al.

It is certified that error appears in the above-identified patent and that said Letters Patent is hereby corrected as shown below:

```
Col. 12, line 23, delete "EOV".
Col. 12, line 55, delete "overrides" and insert
    -- overcomes --.
Col. 14, line 7, delete "apparatus" and insert
    -- operated --.
```

Signed and Sealed this

Nineteenth Day of January, 1988

Attest:

DONALD J. QUIGG

Attesting Officer

Commissioner of Patents and Trademarks